US008931936B1

(12) United States Patent
Tham et al.

(10) Patent No.: US 8,931,936 B1
(45) Date of Patent: Jan. 13, 2015

(54) HEIGHT ADJUSTABLE PENDANT LAMP CANOPY ASSEMBLY

(75) Inventors: Sean Tham, College Point, NY (US); Molly McGee, Newport, RI (US); JunQuan Rao, Fuzhou (CN)

(73) Assignee: W.A.C. Lightning Company Ltd, Port Washington, NY (US)

( * ) Notice: Subject to any disclaimer, the term of this patent is extended or adjusted under 35 U.S.C. 154(b) by 174 days.

(21) Appl. No.: 13/340,518

(22) Filed: Dec. 29, 2011

Related U.S. Application Data (60) Provisional application No. 61/429,137, filed on Jan. 1, 2011.

(51) Int. Cl.
*F21S 8/06* (2006.01)
*F21V 21/36* (2006.01)
*F16G 11/14* (2006.01)
*H01R 4/36* (2006.01)

(52) U.S. Cl.
USPC ......... 362/404; 362/403; 362/457; 24/135 N; 248/328; 439/98; 439/814

(58) Field of Classification Search
CPC ......... F16G 11/06; F16G 11/00; F16G 11/02; F16B 7/0493; F16B 2/065; F16B 7/0433; F16B 7/18; F16B 7/185; H01R 4/32; H01R 4/186; H01R 4/20; H01R 4/60; H01R 4/30; H01R 4/366; H01R 4/64; H01R 9/0524; F21V 21/00; F21V 21/008; F21V 21/10; F21V 21/14; F21V 21/16; A47F 5/0892; A47F 2007/0085
USPC ......... 362/382, 403, 404, 457, 391, 407, 458; 24/129 A, 135 R, 135 A, 135 K, 135 L, 24/135 N, 136 B; 403/391, 396; 248/323, 248/328, 345; 439/98, 814
See application file for complete search history.

(56) References Cited

U.S. PATENT DOCUMENTS

| 1,273,922 | A  | * | 7/1918  | Prattinger | 24/135 N |
|-----------|----|---|---------|------------|----------|
| 2,749,074 | A  | * | 6/1956  | Bodian | 248/344 |
| 3,496,518 | A  | * | 2/1970  | Donato et al. | 439/118 |
| 4,475,226 | A  | * | 10/1984 | Greenberg | 381/300 |
| 4,917,615 | A  | * | 4/1990  | Franks, Jr. | 439/98 |
| 5,249,107 | A  | * | 9/1993  | Poulsen | 362/249.01 |
| 5,611,614 | A  | * | 3/1997  | Morgan | 362/102 |
| 6,443,591 | B1 | * | 9/2002  | Swensson et al. | 362/147 |
| 6,863,423 | B2 | * | 3/2005  | Stone et al. | 362/404 |
| 6,866,410 | B2 | * | 3/2005  | Jesurun et al. | 362/572 |
| 2003/0193810 | A1 | * | 10/2003 | Patz et al. | 362/387 |
| 2008/0285291 | A1 | * | 11/2008 | Fornari | 362/396 |

(Continued)

*Primary Examiner* — Alan Cariaso
(74) *Attorney, Agent, or Firm* — Robert W. J. Usher (57) ABSTRACT

A height-adjustable pendant lamp canopy assembly with an overhead-mounted junction box; a base-plate mounted transformer therein; an apertured insulating spacer plate below the base plate; a releasable cord grip with a threaded lower end protruding through the aperture; and, a clamping nut securing, releasably, the canopy cover on the end of the cord grip. A cord braid connector has a metal body with a cord-receiving, through-socket, a terminating portion for a fixture ground wire, and, a transverse screw hole. A braid-clamping, metal collar is clamped around braid of cord extending through the through-socket with the collar stuffed axially into the through-socket; and a clamping screw in the screw hole anchoring the metal collar and braid in the through-socket in a permanent electrical connection of the braid and the connector body, irrespective of limited lamp raising or lowering movement of the lamp power cord.

6 Claims, 6 Drawing Sheets

(56) References Cited

U.S. PATENT DOCUMENTS

2011/0170704 A1* 7/2011 Smith et al. .................... 381/77
2012/0044703 A1* 2/2012 Wilson et al. ................. 362/365
2012/0257388 A1* 10/2012 Bracher et al. ........... 362/249.01

* cited by examiner

HEIGHT ADJUSTABLE PENDANT LAMP CANOPY ASSEMBLY

RELATED APPLICATION

Priority is claimed from provisional application 61/429137, filed by the present inventors on Jan. 1, 2011, the disclosure of which is incorporated herein by reference.

FIELD OF THE INVENTION

The invention relates to fixtures for low voltage, pendant lamps and particularly to height adjustable canopy assemblies therefor.

BACKGROUND OF THE INVENTION

In typical installations, low voltage pendant lamps such as LED lamps of 5 watt or less and halogen lamps of 50 watt or less, are suspended at selected heights from their coaxial power cords which comprise a negative inner conductor within insulation surrounded by a positive (earth) outer conductor of metal braid.

For esthetic reasons, it is frequently necessary to effect relatively small readjustments to the heights of individual lamps after installation, especially, for example, when installing a row of pendant lamps at identical heights. Previously, to effect the readjustments, it has typically been necessary to release a screw which clamps the power cord to the canopy, release/lower the canopy cover, manually pull more cord into the canopy to raise the lamp or release cord from the canopy by pushing/pulling through the canopy cover to lower the lamp and, then to raise/reseat the canopy cover and re-tighten the cord clamping screw.

Although, any excess cord is readily accommodated in concealed condition within in the canopy, as a result of the outer metal braid being spirally woven around the insulation, any manual pulling or pushing force exerted on the outside of the cord tends to shift the metal braid along the cord insulation relative to the inner conductor, with the risk that the braid may be shifted into electrical contact with the stripped/exposed terminated end of inner conductor or with conducting portions of an associated connector (such a wire nut) used to connect the inner conductor to a (negative) live/power wire from the transformer, resulting in a short circuit.

To eliminate such risk, it is normally considered prudent to lower/unseat the canopy cover from the fixture to provide visual and manual access to the terminated end of the cord in the canopy, to enable the terminated cord to be checked and re-adjust/re-trim the braid to obviate any risk of a short circuit.

Clearly, such re-termination or braid adjustment steps are undesirably time consuming and to be avoided, if possible. Furthermore, as the clamping screw must clamp the cord sufficiently tightly to carry the weight of the lamp, there can be an increased risk of the technician overtightening the clamping screw, penetrating the insulation and short circuiting the ground braid to the inner conductor.

SUMMARY OF THE INVENTION

According to one aspect, the invention provides, a braid connecting assembly comprising a one-piece metal connector body formed with a cord receiving, braid terminating, through-socket with a radially/transverse communicating screw hole and a terminating portion for a fixture ground wire; a clamping screw for the screw hole; and, a braid covering metal collar receivable axially in the through-socket whereby a stripped end portion of a power cord can be threaded into the collar and the collar slid along the cord into covering relation with the metal braid, the stripped end portion of the power cord then threaded through the through-socket and the collar, covering the braid, stuffed into the through-socket and the clamping screw tightened to clamp the collar against the braid thereby securing the braid in the through-socket against axial movement along the insulation with electrical termination thereof, with the stripped end of the cord extending free of the assembly for connection to a fixture power wire.

Tightening the clamping screw crimps or deforms the collar tightly against the braid.

As the braid is prevented from being pushed or pulled along the power cord by lamp raising or lower manipulations, the risk of short circuit is obviated as is the prior requirement to disassemble the canopy to inspect or adjust the braid disposition with a very significant saving of installation/application costs.

Preferably, the collar is formed at one axial end with an annular, radially outwardly extending flange of greater diameter than that of the through-socket to aid cord threading therethrough and retention of the collar therein, facilitating assembly handling.

In some applications, the collar may be omitted entirely and reliance placed on the clamping screw directly clamping the braid in the through-socket, preventing movement of the braid axially along the cord.

Preferably, the canopy is mounted with a 'press to release' cord gripping device of known type obviating the requirement to release and tighten the cord clamping screw. In some installations, it is also possible to pull more cord out of the canopy cover to lower the lamp without needing release/disassembly of the canopy cover fixture, providing an additional saving in time and, therefore, applied cost.

According to another aspect, the invention provides a height-adjustable pendant lamp canopy assembly comprising: an overhead-mounted junction box; a base-plate mounted transformer received in the junction box; an insulating spacer plate formed with a central opening and located below the base plate in insulating relation; a braided lamp cord grip comprising an elongate, cable-receiving, body with a lower, tubular, externally threaded end portion having an axial cable-receiving passageway and being suspended from the base plate extending downward through the central opening of the insulating spacer plate exposing the threaded end portion, the cord grip being releasable to permit longitudinal cord movement there-through to raise and lower the lamp; a canopy cover with a central opening receiving the threaded end portion of the cord grip extending there-through; a clamping nut on the threaded end portion securing, releasably, the canopy to the cord grip adjacent the end portion; a cord braid connecting assembly comprising: a connector having a metal body formed with a cord-receiving, axial through-socket, a terminating portion for a fixture ground wire, and, a screw hole communicating transversely with the through-socket; a braid-clamping, metal collar clamped around braid of cord extending through the through-socket with the collar stuffed axially into the through-socket; and a clamping screw in the screw hole anchoring the metal collar and braid in the through-socket in a permanent electrical connection of the braid and the connector body, irrespective of limited lamp raising or lowering movement of the lamp power cord.

BRIEF DESCRIPTION OF THE DRAWINGS

Embodiments of the invention will now be described by way of example only with reference to the accompanying drawing in which:

FIGS. 5a-c are schematic views illustrating braid preparation steps to facilitate power cord threading through the cord gripping mechanism; and, FIG. 6 is a perspective view of the fixture showing the cord with prepared braid aligned for threading through the cord gripping mechanism;

PARTICULAR DESCRIPTION

Figure 1:
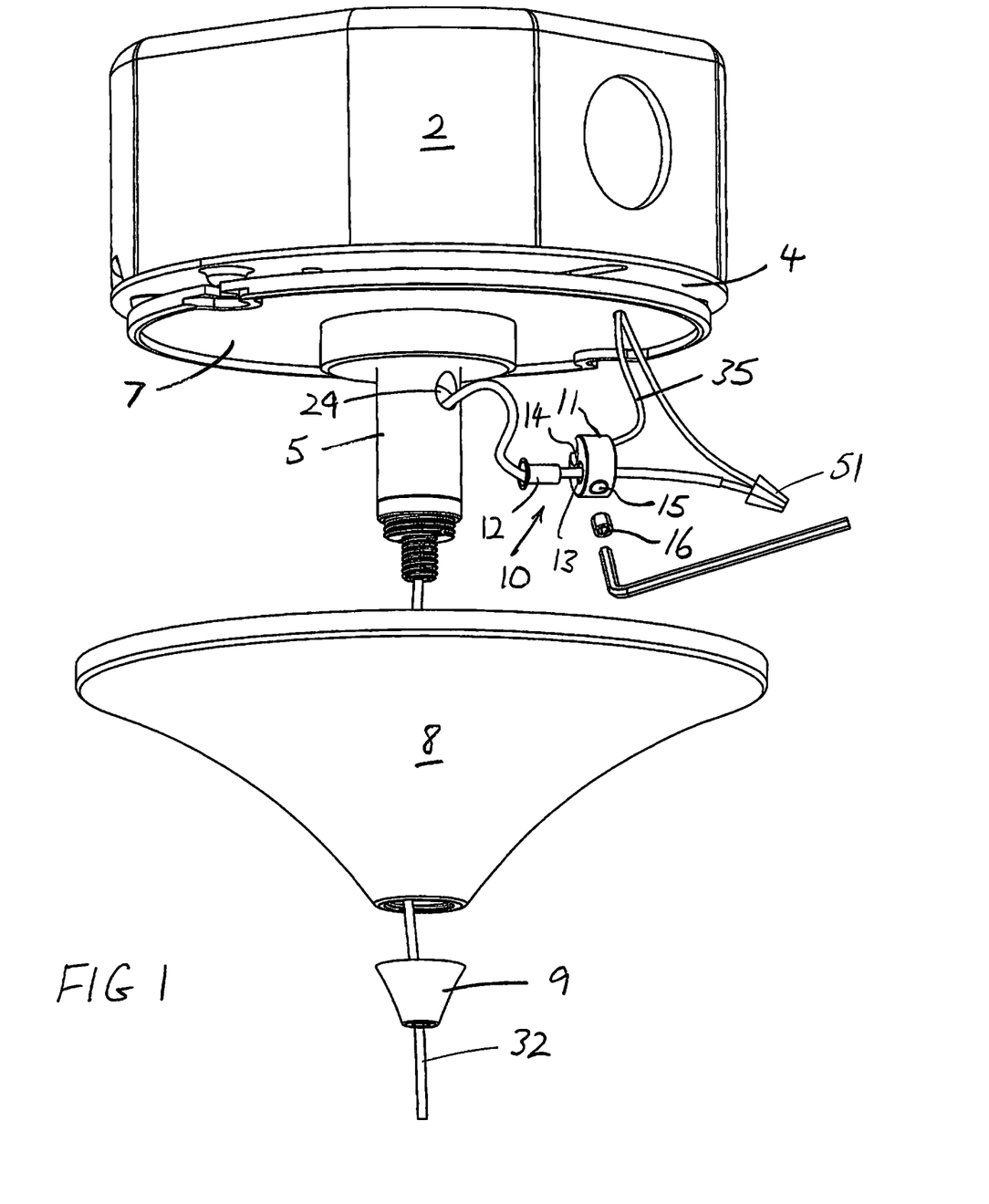
FIG. 1 is a perspective view of a height adjustable canopy fixture for an LED lamp with the canopy cover lowered/unseated from a transformer base plate to show the power cord prior to final termination in the braid connecting assembly.
Figure 2:
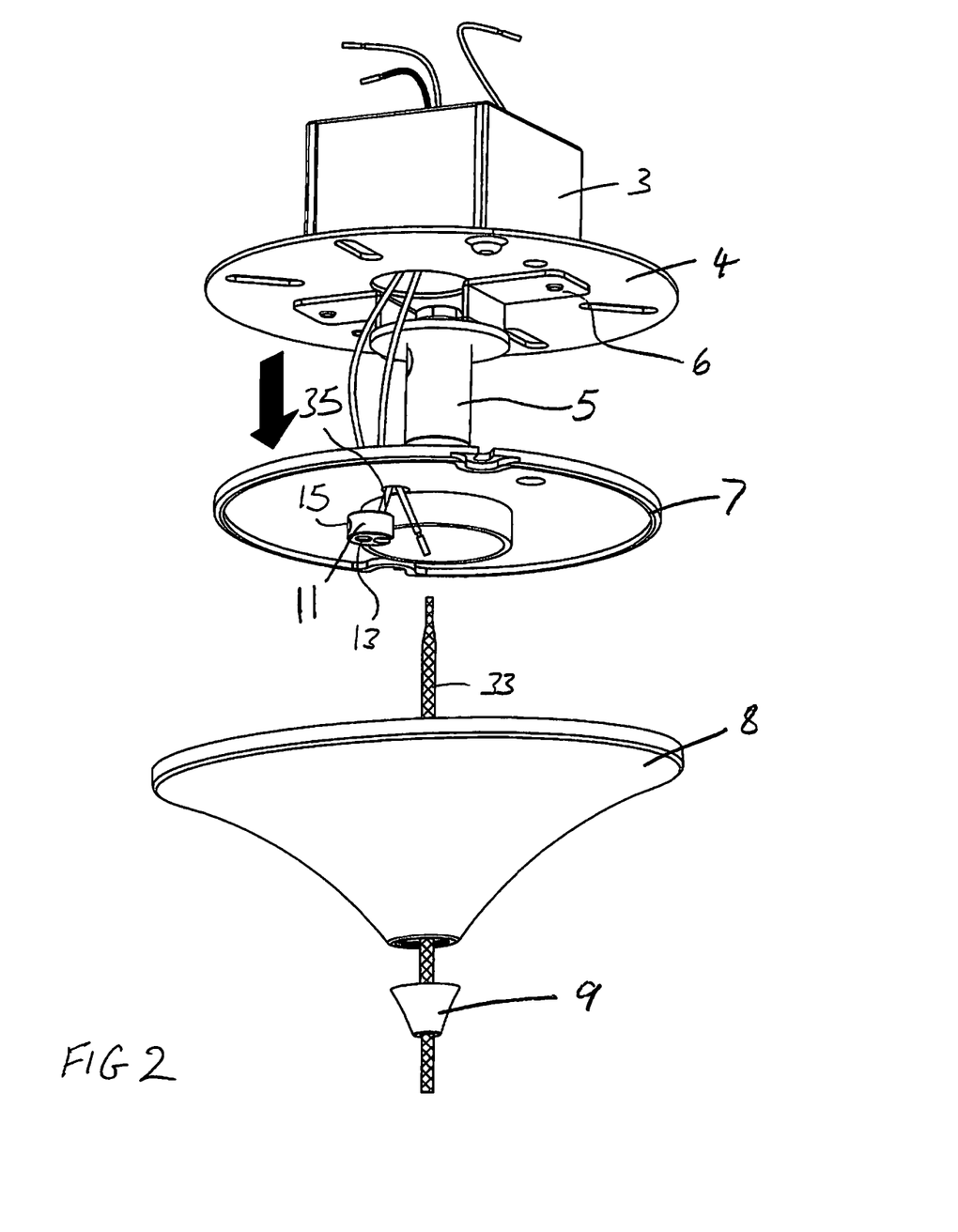
FIG. 2 is an exploded perspective view prior to termination of the power cord, with the junction box omitted.

As shown particularly in FIGS. 1 and 2, a height adjustable canopy fixture comprises a junction box 2 receiving a step-down transformer 3 mounted on base plate 4; a cable/cord grip 5 suspended from the base plate by brackets 6 to extend through a plastic, insulating spacer plate 7 to expose a lower externally threaded end portion and, a canopy cover 8 secured, releasably, to the threaded end portion of the cord grip by a nut 9.

A braid-connecting/terminating assembly 10 comprises a connector 11 and a braid clamping collar 12 engageable therewith. The connector 11 comprises a disk-like, one-piece, metal body formed with a cord-receiving, braid-terminating, through-socket 13, a terminating socket 14 for a transformer ground wire 35 and a screw hole 15 communicating radially with the socket 13 and receiving (allen type) clamping screw 16. The braid clamping collar 12 is formed at one axial end with an annular, radially outwardly extending flange 31 of greater diameter than that of the through-socket to aid cord threading and retention of the collar therein, facilitating assembly handling.

Figure 3:
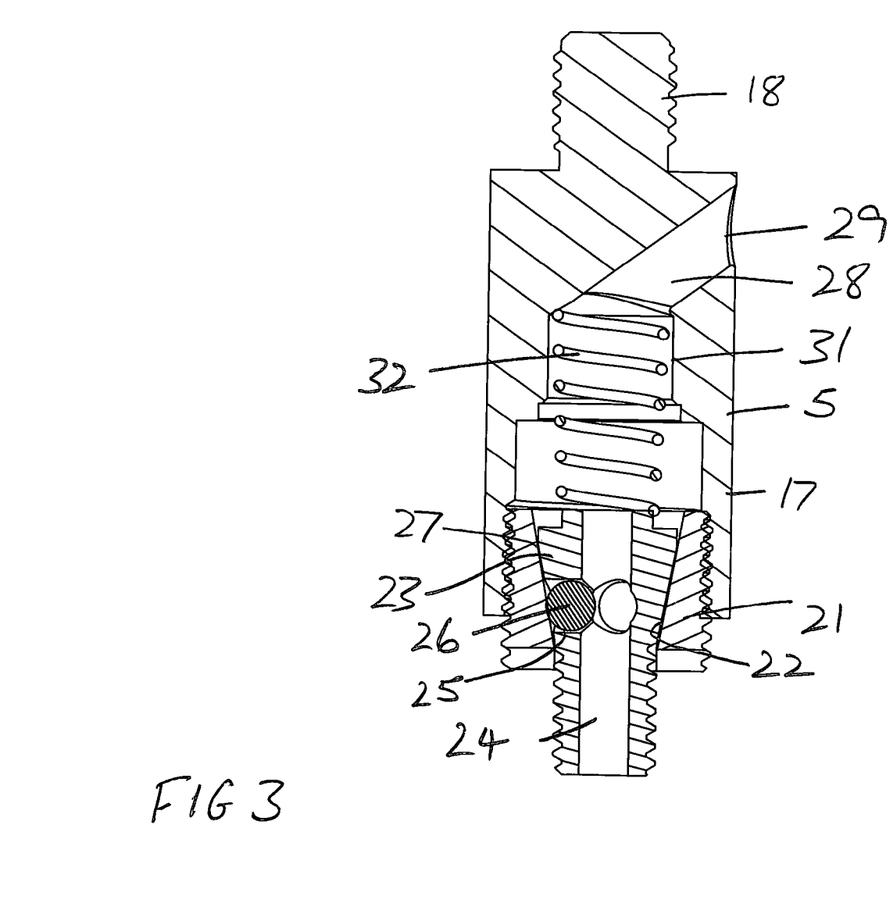
FIG. 3 is an axial cross-section of the mechanism of a releasable cord grip device.

As shown also in FIG. 3, the cable/cord grip 5 comprises a cylindrical outer metal body 17 formed at an upper axial end with an externally threaded protrusion 18 attached to brackets 6 and, at a lower axial end with an internally threaded cavity 21 receiving, in threaded engagement, a 'slip cover' 21 having an internal, upwardly divergent conical cam surface 22. A ball carrier 23 is formed with an axial, cord-receiving bore 24 encircled by a ring of three apertures in each of which a ball 26 is captured by engagement with cam surface 22 and, an upwardly divergent, conical, outer cam surface 27 in complementary sliding relation with cam surface 22. The cable/cord grip body 17 is also formed with an axial cavity 31 which traps a compression spring 32 and communicates at a lower end with bore 24 and, has a laterally extending upper portion 28 opening to a side of the cable grip at a cord exit 29.

The spring 32 normally biases the carrier into a lowermost position in which the cam surface 22 is of minimum diameter urging the balls radially inwardly into cord gripping engagement. Ball carrier 23 can be forced upward with compression of the spring to bring the balls into alignment with a radially larger portion of the camming surface 22, enabling the balls to move radially outwardly, releasing the cord to enable height adjustment of a suspended lamp. It will be noted that, whereas, a downward force on the cord will tend also to draw the carrier and balls downward and with the cam surface 22 forcing the balls inward, increasing the gripping force on the cord, an upward pushing force on the cord will tend to urge the carrier upward against the spring—enabling the balls to be moved radially outward to release the cord gripping force. In some applications, the lamp suspension height may therefore be reduced by pushing the cord upward through the cord grip obviating need to release the nut 9 and lower the canopy, but whether such is practical will depend on the force of the biasing spring.

In wiring the canopy, the canopy nut 9 is unscrewed and the canopy cover 8 removed from the cord/cable grip. The insulation plate 7 is then pulled down and the canopy supported while black and white wires from the transformer are guided into the junction box. The ground wire from the junction box is connected to the green ground wire from the base plate and the live wires from the junction box connected to the corresponding transformer wires (see FIG. 2). The transformer base plate 4 and the insulation plate 7 are then re-attached to the junction box 2.

Figure 4A:
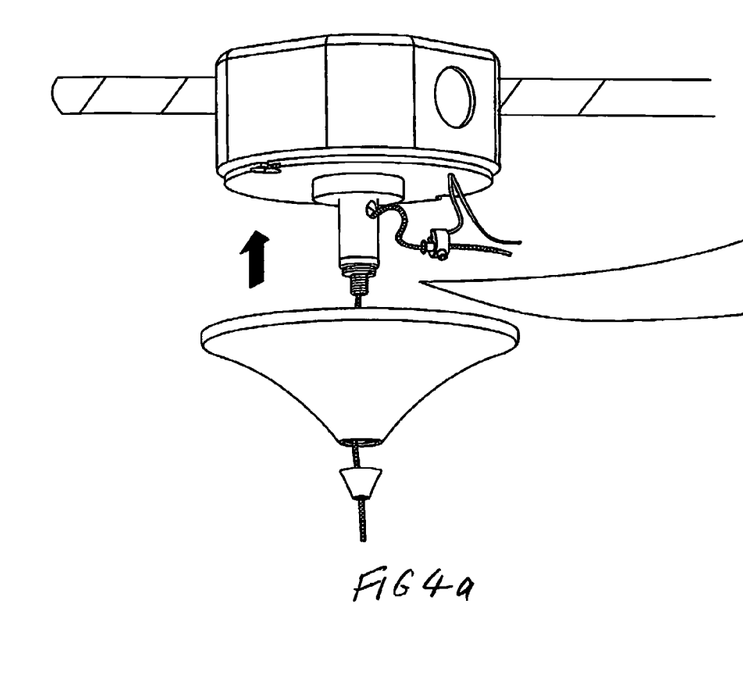
FIGS. 4a and 4b are perspective views showing release of the canopy cover and adjustment of the power cord length.
Figure 4B:
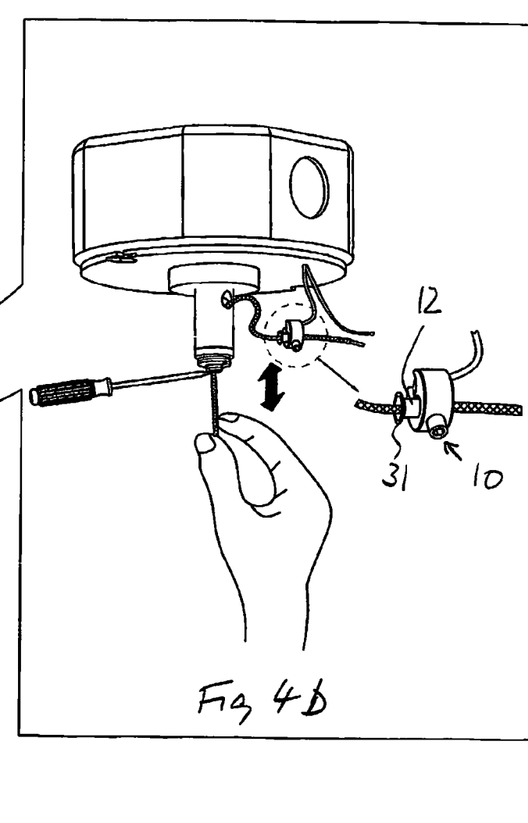
Figure 5:
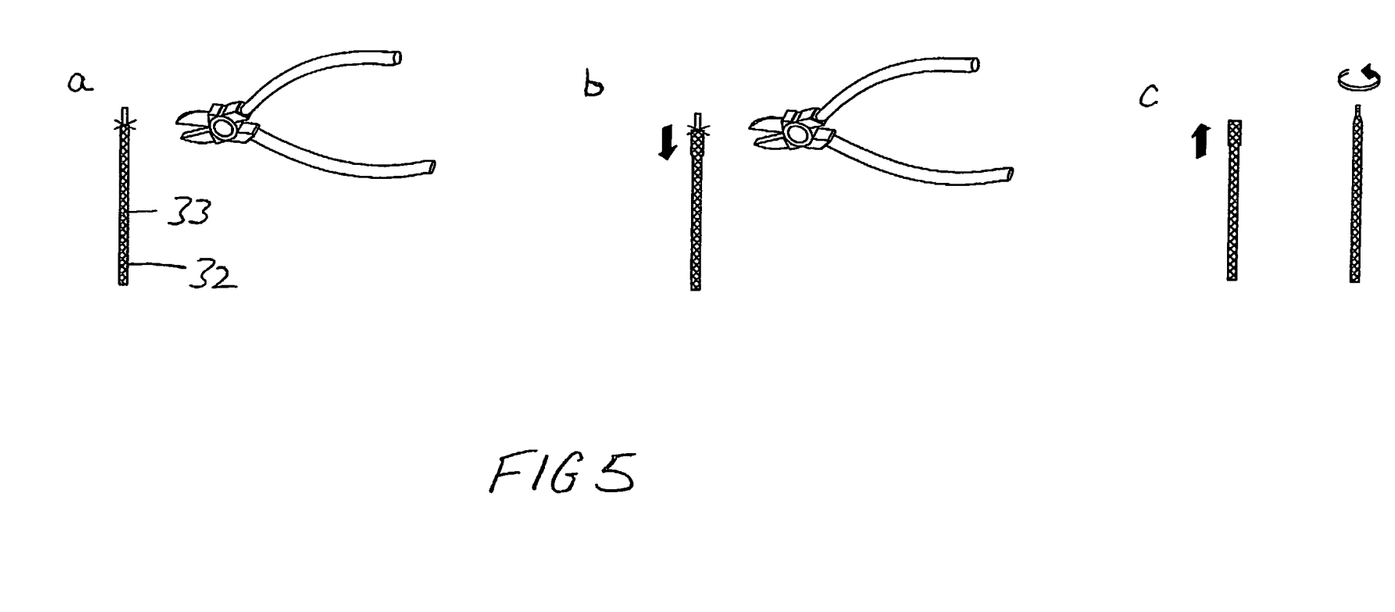
Figure 6:
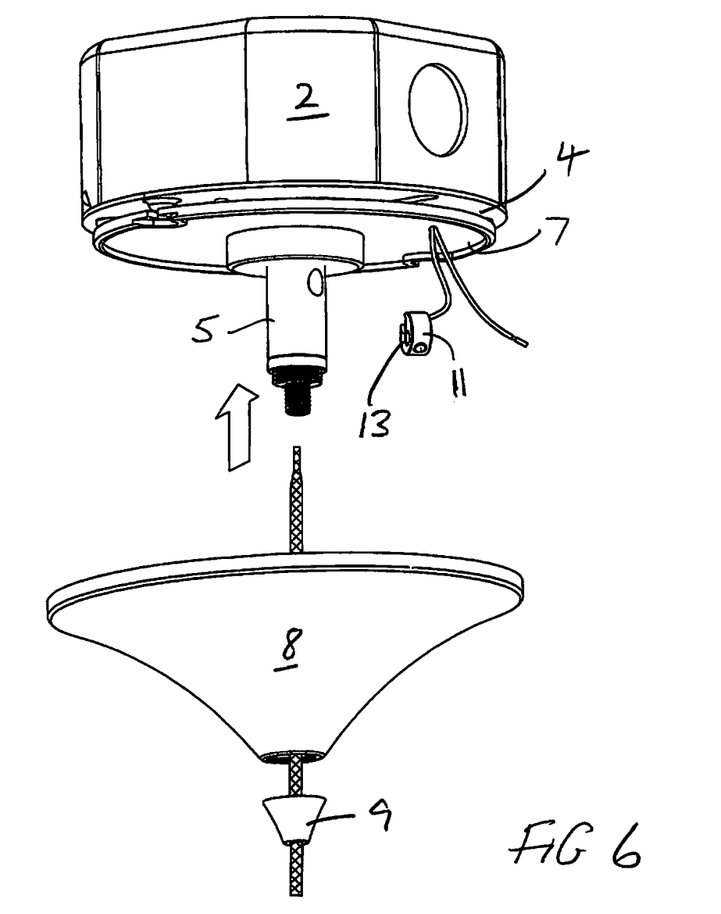

As seen in FIG. 5, the cord 32 is cut to a length corresponding the desired suspension height of the lamp (step 1). The woven metal ground braid 33 is then pushed away from the cut end to expose the cut end portion which is then trimmed by ⅛ inch. The braid is then pulled axially along the cord beyond the trimmed end and twisted into a point (step 3). As shown in FIG. 6, the braided cord is push-threaded through the canopy nut 9, canopy cover 8 and cable/cord grip until approximately 3 inches extends free of the exit 29. The cut cord end is threaded into the collar until a short portion of braid is exposed, protruding from the smaller end. The collar covering the braid is stuffed into the socket 13 and the screw tightened to clamp and deform the collar against the braid both electrically connecting the braid to the other ground wire previously connected by soldering in the other socket 14 and mechanically clamping the braid against movement along the insulated inner wire, as seen in FIG. 4b.

A wire nut 51 is used to connect the inner conductor to the negative wire from the transformer as seen in FIG. 1 in which the collar and nut are shown in released condition to show the collar structure more clearly.

The canopy cover is then raised and reassembled with the cable/cord grip by tightening the nut.

As the braid is prevented from being pushed or pulled along the power cord by lamp raising or lower manipulations, the risk of short circuit is obviated as, when shortening the cord by pushing up, is the prior requirement to disassemble the canopy to inspect or adjust the braid disposition with a very significant saving of installation/application costs.

However, as shown in FIG. 4b, when greater cord length is required to lower a lamp, a tool such as a screw driver (or, depending on spring strength—the installers finger) is employed to push up the carrier to release the wire for downward movement through the grip.

The invention claimed is:

1. A height-adjustable pendant lamp canopy assembly comprising:
    an overhead-mounted junction box;
    a base-plate mounted transformer received in the junction box;
    an insulating spacer plate formed with a central opening and located below the base plate in insulating relation;
    a braided lamp cord grip comprising an elongate, cable-receiving, body with a lower, tubular, externally threaded end portion having an axial cable-receiving passageway and being suspended from the base plate extending downward through the central opening of the insulating spacer plate exposing the threaded end portion, the cord grip being releasable to permit longitudinal cord movement there-through to raise and lower the lamp;

a canopy cover with a central opening receiving the threaded end portion of the cord grip extending there-through;

a clamping nut on the threaded end portion securing, releasably, the canopy cover to the cord grip adjacent the end portion;

a cord braid connecting assembly comprising:

a connector having a metal body formed with a cord-receiving, axial through-socket, a terminating portion for a fixture ground wire, and, a screw hole communicating transversely with the through-socket;

a braid-clamping, metal collar clamped around braid of cord extending through the through-socket with the collar stuffed axially into the through-socket; and a clamping screw in the screw hole anchoring the metal collar and braid in the through-socket in a permanent electrical connection of the braid and the connector body, irrespective of limited lamp raising or lowering movement of the lamp power cord.

2. A height-adjustable pendant lamp canopy assembly according to claim 1 wherein the braid clamping collar is formed at one axial end with an annular, radially outwardly extending flange of greater diameter than a diameter of the through-socket.

3. A height-adjustable pendant lamp canopy assembly according to claim 2 wherein the cord grip comprises a press-to-release mechanism providing cord releasability.

4. A height-adjustable pendant lamp canopy assembly comprising:

an overhead-mounted junction box;

a base-plate mounted transformer received in the junction box;

an insulating spacer plate formed with a central opening and located below the base plate in insulating relation;

a releasable lamp cord grip comprising an elongate, cable-receiving, body with a lower, tubular, externally threaded end portion having an axial cable-receiving passageway and being suspended from the base plate extending downward through the central opening of the insulating spacer plate exposing the threaded end portion, the cord grip being releasable to permit longitudinal cord movement there-through to raise and lower the lamp;

a canopy cover with a central opening receiving the threaded end portion of the cord grip extending there-through;

a clamping nut on the threaded end portion securing, releasably, the canopy cover to the cord grip adjacent the end portion;

a lamp cord braid connecting assembly comprising:

an electrical connector having a metal body formed with a cord-receiving, axial through-socket, a terminating portion for a fixture ground wire, and, a braid embracing means for anchoring the braid in the through-socket in a permanent electrical connection of the braid and the connector body, irrespective of limited lamp raising or lowering movement of the lamp power cord.

5. A height-adjustable pendant lamp canopy assembly according to claim 4 wherein the braid embracing means comprises a metal collar embracing the braid and stuffed axially into the through-socket.

6. A height-adjustable pendant lamp canopy assembly according to claim 5 wherein the clamping collar is formed at one axial end with an annular, radially outwardly extending flange of greater diameter than a diameter of the through-socket.

* * * * *